United States Patent [19]

Caravito

[11] 4,070,071
[45] Jan. 24, 1978

[54] TRACTION ELEMENT FOR REMOVABLE TRACK

[75] Inventor: Vito A. Caravito, Uniontown, Ohio

[73] Assignee: The Goodyear Tire & Rubber Company, Akron, Ohio

[21] Appl. No.: 656,530

[22] Filed: Feb. 9, 1976

[51] Int. Cl.² .............................................. B60S 1/62
[52] U.S. Cl. ........................................ 305/13; 305/19
[58] Field of Search ............... 305/19, 54, 55, 35 EB, 305/13, 38, 39, 53; 301/41 R, 43, 44 R, 44 T; 152/209 R, 209 B, 182, 199, 226

[56] References Cited

U.S. PATENT DOCUMENTS

| 2,712,964 | 7/1955 | Waller | 305/53 |
| 3,773,394 | 11/1973 | Grawey | 305/19 |
| 3,883,191 | 5/1975 | Chaumont | 305/35 EB |

FOREIGN PATENT DOCUMENTS

| 527,836 | 5/1930 | Germany | 301/43 |
| 1,238,637 | 7/1971 | United Kingdom | 152/226 |

Primary Examiner—Robert B. Reeves
Assistant Examiner—H. Grant Skaggs
Attorney, Agent, or Firm—F. W. Brunner; R. P. Yaist; Frederick K. Lacher

[57] ABSTRACT

A removable track for an annular resilient tire having a plurality of elongated transversely extending traction shoes mounted on a belt at spaced-apart positions along the belt. Each of the shoes has a plurality of raised traction bars at the end portions of the shoes and a central raised traction bar at a central portion of the shoe. The traction bars extend generally in a direction from one end of the shoe to the other end with the end bars being positioned on the shoe at a distance from a side edge less than the distance of the central bar from the side edge to provide a flex area for cleaning of the shoes. The traction bars at the ends of the shoes may include transverse bars to reinforce the ends of the shoes and angular bars at an acute angle to the side edges to provide traction in the lateral direction.

10 Claims, 7 Drawing Figures

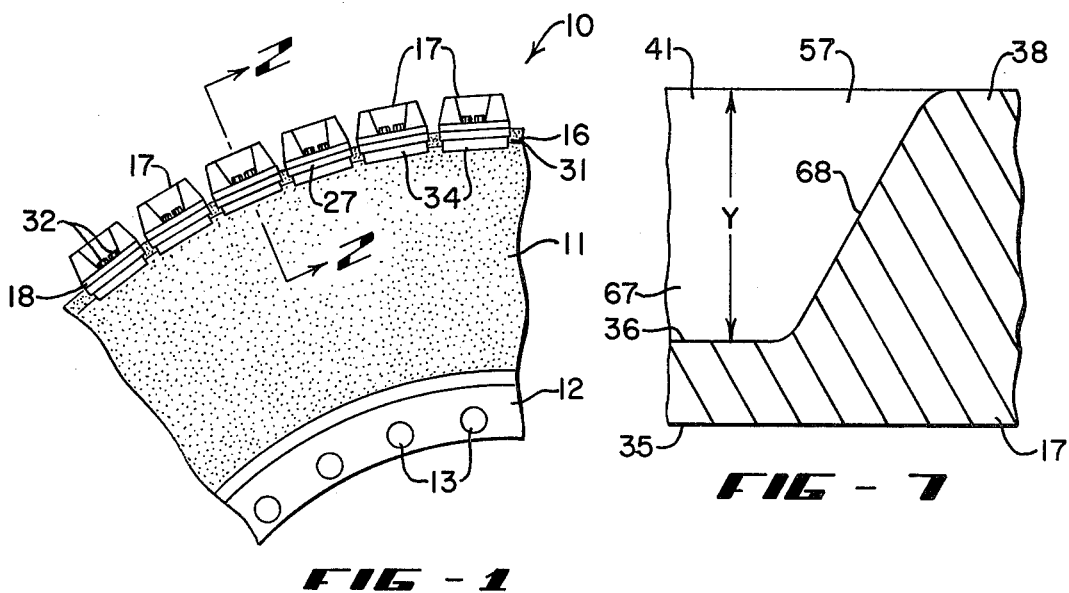
FIG-1
FIG-7
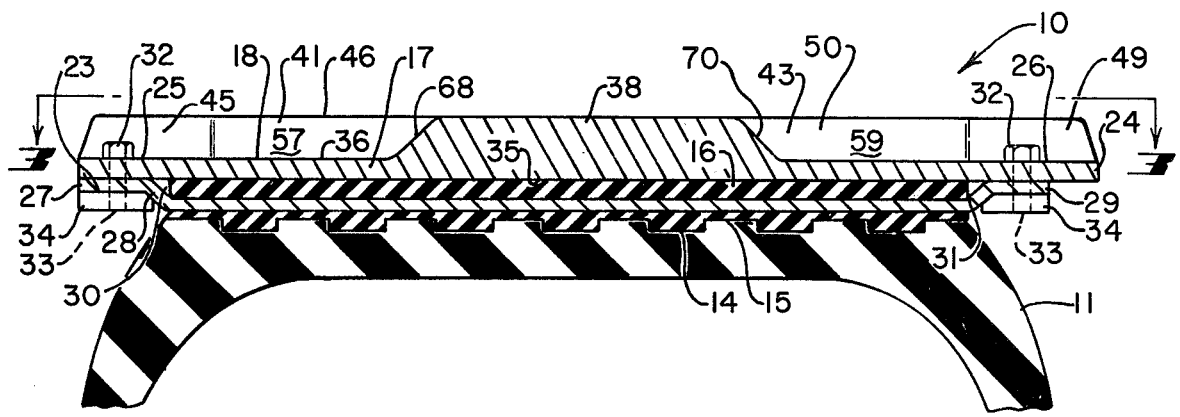
FIG-2
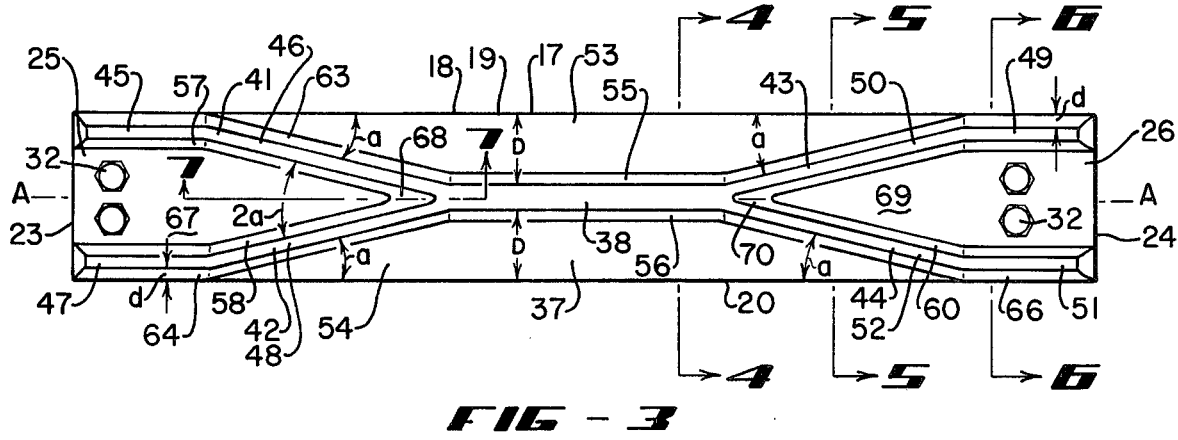
FIG-3

TRACTION ELEMENT FOR REMOVABLE TRACK

This invention relates generally, as indicated, to a track for an annular resilient tire. The track has an annular flexible belt which is mounted about the outer circumference of an annular resilient tire. A plurality of wear-resisting shoes of steel or other wear-resisting material are fastened to the belt providing a traction surface which has satisfactory wear-resisting properties for operation in environments where the ground surface contains rock or other highly abrasive material.

Heretofore, the shoes of the track have had traction bars; however, the bars have either been straight and extended transversely of the belt from one end of a shoe to the other or they have had an angular configuration which is directional requiring different shoes on each side of the vehicle. The angular configuration provides traction in the lateral direction which is not provided by the staight transversely extending bars but because the angular traction bar patterns are usually directional, the inventory of spare parts must be twice that for shoes having the straight transversely extending bars. The shoes having annular bars have provided some reinforcement of the end portions; however, the bar design has not permitted the use of one master casting or forging for different length shoes having ends of the shoes which may be sawed off or otherwise removed to shorten the shoes. Another problem causing premature failure of the shoes has been the localized stress concentrations due to a nonuniform section modulus over the length of the shoe.

With the foregoing in mind, it is the principal object of this invention to provide a track with each of the shoes having traction bars positioned to provide a flex area between shoes for cleaning and reinforcement of the end portions of the shoe.

Another object is to provide a plurality of traction bars at each end of the shoe.

Still another object is to provide traction bars at an angle to the side edges of the shoe for traction in the lateral direction.

A further object is to provide traction bars at the end portions of the shoe which can be cut off to shorten the shoe without adversely affecting the efficiency of the traction bar configuration.

A still further object is to provide a substantially uniform section modulus over the length of the shoe.

Another object is to provide a shoe for use on tracks on both sides of a vehicle.

Still another object is to provide an easily cleaned space between coverging traction bars on a shoe.

A further object is to provide a shoe having traction bars in symmetrical positions about an axis extending from end-to-end of the shoe.

These and other objects of the present invention may be achieved by a track in which each of the shoes has a central traction bar connecting a plurality of traction bars at both ends of the shoe. The traction bars at the ends extend to the end edges for reinforcing the ends and may have bars at an acute angle to the side edges to provide traction in the lateral direction.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a fragmentary schematic elevation of a track mounted on a resilient tire.

FIG. 2 is an enlarged fragmentary view taken along the plane of line 2—2 in FIG. 1.

FIG. 3 is a plan view of one of the shoes taken along the plane of line 3—3 in FIG. 2.

FIG. 7 is an enlarged fragmentary sectional view taken along the plane of line 7—7 in FIG. 3.

Figure 4:
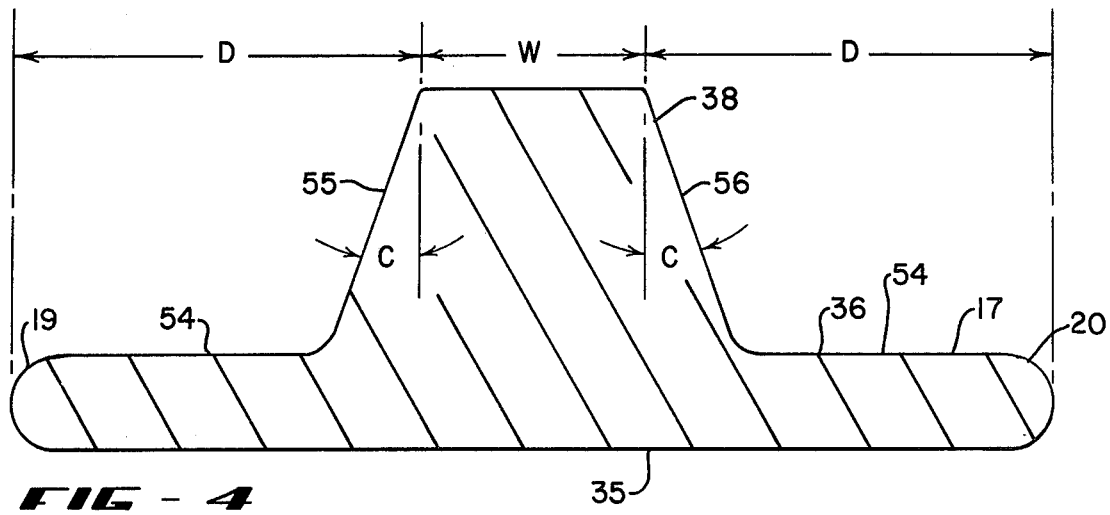
FIG. 4 is an enlarged sectional view of the shoe taken along the plane of line 4—4 in FIG. 3.

Referring to FIG. 1, a removable track 10 is shown mounted on an annular resilient tire 11 which in turn may be mounted on a rim 12 for bolting to a wheel (not shown) by means of bolt holes 13 in the rim. The tire 11 may be of rubber or other rubberlike material reinforced with piles of cords (not shown) which may be of steel, textile fibers or other suitable material. The tire 11 may also have bead portions at the inner periphery containing annular beads of steel or other nonextensible material for mounting of the tire on the rim 12. The tire 11 may also be inflatable with air or other suitable fluid through a valve (not shown).

As shown more clearly in FIG. 2, the tire 11 has a grooved surface 14 for mating engagement with a matching grooved surface 15 of a belt 16 of the track 10. The belt 16 is a flexible cylindrical body of rubber or other rubberlike material reinforced by circumferential, substantially inextensible members such as steel wire (not shown). Traction shoes 17 are fastened to the belt 16 at spaced-apart positions along the belt. Each of the shoes 17 includes a substantially rigid elongated plate 18 of a wear-resistant material such as cast or forged steel extending transversely of the belt 16. In the embodiment shown, the plate 18 is rectangular with side edges 19 and 20 and end edges 23 and 24. The plate 18 of each of the traction shoes 17 also has end portions 25 and 26 for fastening to mounting plates 27 which may be molded in the belt 16 and have offset end flanges 28 and 29 in engagement with the end portions 25 and 26, respectively, of the plate for each of the traction shoes. The end portions 25 and 26 extend beyond circumferentially extending edges 30 and 31 of the belt 16. Fasteners such as bolts 32 extend through holes in the end portions 25 and 26 of the plate 18 of each of the traction shoes 17 and through corresponding holes in the end flanges 28 and 29 of each of the the mounting plates 27 at mounting positions on the traction shoes. Threaded ends 33 of the bolts 32 are in threaded engagement with threaded holes in retainer blocks 34 located under the end flanges 28 and 29 of the mounting plates 27 for clamping the plate 18 of each of the traction shoes 17 to the belt 16. The plate 18 has a belt-engaging surface 35 and a generally flat ground-engaging surface 36, as shown in FIG. 2, with a central portion 37 located between the end portions 25 and 26.

As shown more clearly in FIGS. 2 and 3, each of the traction shoes 17 has a raised central bar 38 extending generally in a direction between the end portions 25 and 26 along a transverse centerline A—A of the plate 18. The central bar 38 is connected to raised end bars 41 and 42 at the end portion 25 and end bars 43 and 44 at the end portion 26. The end bars 41 through 44 extend generally in a direction from the end edges 23 and 24 to the central portion 37.

End bar 41 consists of a raised transverse bar 45 and a raised angular bar 46. The transverse bar 45 extends generally in the same direction as the central bar 38 from the end edge 23 towards the central portion 37. The angular bar 46 extends between the transverse bar 45 and the central bar 38 at an acute angle (a) of from 10° to 30° relative to the side edge 19. The end bar 42 consists of a raised transverse bar 47 extending generally in the same direction as the central bar 38 and in parallel relationship to the transverse bar 45. The end bar 42 also includes a raised angular bar 48 extending between the transverse bar 47 and the central bar 38 at an acute angle (a) of from 10 to 30 degrees to the side edge 20.

End bar 43 consists of a raised transverse bar 49 extending generally in the same direction as the central bar 38 from the end edge 24 towards the central portion 37 and a raised angular bar 50 extending from the tansverse bar 49 to the central bar 38 at an acute angle (a) of from 10° to 30° to the side edge 19. End bar 44 consists of a raised transverse bar 51 extending generally in the same direction as central bar 38 from end edge 24 towards the central portion 37 and an angular bar 52 extending from the transverse bar 51 to the central bar 38 at an acute angle (a) of from 10° to 30° relative to the side edge 20.

Preferably, the transverse bars 45, 47, 49 and 51 have a length greater than the distance from the bolts 32 to the end edges 23 and 24 to provide a reinforcement to the end portions 25 and 26 which extend beyond the edges 30, 31 of the belt 16. The transverse bars 45, 47, 49 and 51 are located adjacent the side edges 19 and 20 to provide the maximum reinforcement and at the same time provide clearance for the holes through which bolts 32 extend for clamping the plate 18 of each of the shoes 17 to each of the mounting plates 27. The transverse bars 45, 47, 49 and 51 also are positioned in parallel pairs so that one master casting or forging may be used for different length shoes 17. The desired length of the shoes 17 is provided by sawing off portions of the end portions 25 and 26. With the transverse bars 45, 47, 49 and 51 having a parallel configuration, this will not adversely affect the traction bar pattern.

The length of the central bar 38 is preferably approximately the same as the distance between the ends of the central bar 38 and the end edges 23 and 24 providing flex areas 53 and 54 on the ground-engaging surface 36 of each of the shoes 17 between the central bar 38 and the side edges 19 and 20. Preferably, the distance D between the central bar 38 and the side edges 19 and 20 is substantially greater than the distance (d) from the transverse bars 45, 47, 49 and 51 to the side edges 19 and 20.

In order that the section modulus of the shoes 17 may be maintained substantially the same over the length of the shoes, the width W of the central bar 38 is generally twice the width (w) of the end bars 41 through 44. Also, the end bars 41 and 42 and the end bars 43 and 44 are symmetrical about the transverse centerline A—A providing traction shoes 17 which may be used on tires 11 on either side of a vehicle.

Figure 5:
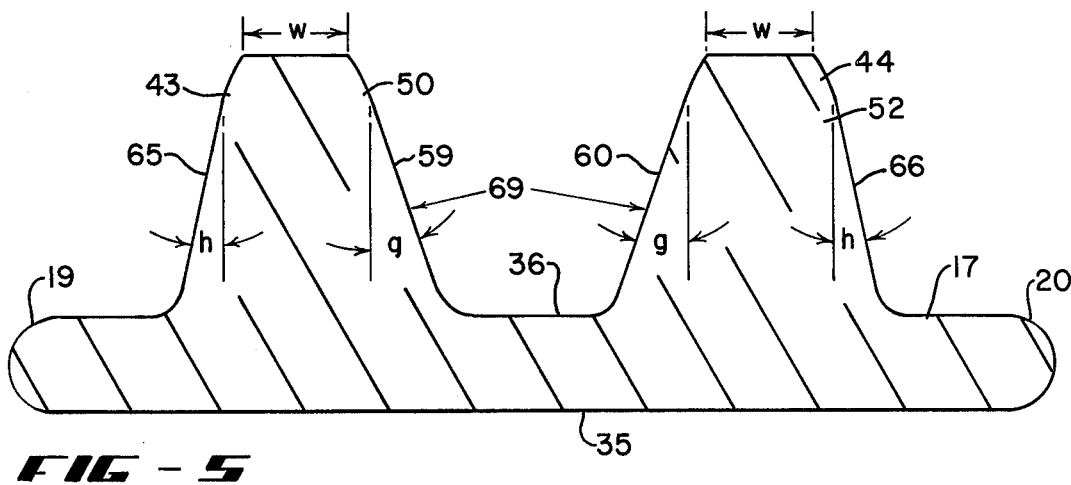
FIG. 5 is an enlarged sectional view taken along the plane of line 5—5 in FIG. 3.
Figure 6:
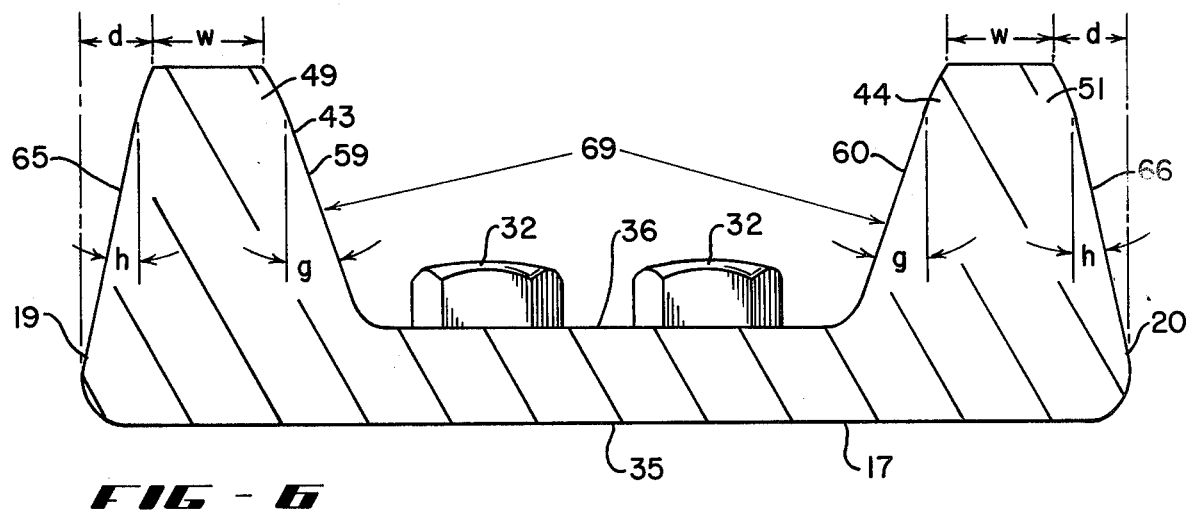
FIG. 6 is an enlarged sectional view taken along the plane of line 6—6 in FIG. 3.

The central bar 38 has sloped sides 55 and 56, as shown in FIG. 4, and in this embodiment the sides are sloped at an angle (c) of approximately 20° relative to planes perpendicular to the plane of the ground-engaging surface 36. The inside sloped sides 57, 58, 59 and 60 of the end bars 41 through 44, respectively, are sloped at an angle (g) of approximately 20° to planes perpendicular to the plane of the ground-engaging surface 36. The sloped sides 63 through 66 of the outer surfaces of the end bars 41 through 44, respectively, are at an angle (h) of approximately 12½ degrees to planes perpendicular to the plane of the ground-engaging surface 36. As shown in FIG. 7, space 67 between the end bars 41 and 42 has a decreasing depth Y as the bars converge and the sloped sides 57 and 58 converge providing a sloped end 68 to facilitate cleaning of this space and removal of soil therefrom. Likewise, space 69 between the end bars 43 and 44 has a sloped end 70 to facilitate removal of soil from that space. As shown in FIGS. 4, 5 and 6, the central bar 38 and end bars 41 and 42 have generally the same height above the ground-engaging surface 36.

In operation, the track 10 is mounted on the tire 11 for rotation in either direction. As the tire 11 rotates, the central bar 38 and the transverse bars 45, 47, 49 and 51 provide traction in the forward and rearward directions. The angular bars 46, 48, 50 and 52 also provide traction in the forward and rearward directions but in addition provide traction in a lateral transverse direction. The flex areas 53 and 54 of adjacent shoes 17 have a sufficient width to eject the soil from the track 10 as the shoes rotate and move relative to each other. The soil lodged in the spaces 67 and 69 between the end bars 41 through 44 is urged outward toward the end edges 23 and 24 which facilitates ejection as the shoes 17 rotate with the track 10 on tire 11. Because each of the shoes 17 have central bar 38 and end bars 41 through 44 which are symmetrical about the transverse centerline A—A, the shoes may be used effectively for traction in either direction and therefore be mounted on tracks 10 on either side of the vehicle. The transverse bars 45, 47, 49 and 51 not only reinforce the end portions 25 and 26 of the shoes 17 but also are in parallel configurations to permit the manufacture of different length shoes with the same master casting or forging. This is done by making one length of shoe 17 and then cutting part of the end portions 25 and 26 off to the desired length of shoe.

While a certain representative embodiment and details have been shown for the purpose of illustrating the invention, it will be apparent to those skilled in the art that various changes and other modifications may be made therein without departing from the scope of the invention.

What is claimed is:

1. A track for an annular resilient tire comprising a flexible belt, a plurality of substantially rigid elongated shoes extending transversely over axial edges of said belt and being mounted on said belt at spaced-apart positions along said belt, each of said shoes having a belt-engaging surface, a generally flat ground-engaging surface, side edges, end edges, end portions adjacent said end edges, a central portion between said end portions, a plurality of raised end bars positioned on said ground-engaging surface at each of said end portions, a raised central bar positioned on said ground-engaging surface at said central portion and extending generally parallel with said end bars in a direction from one of said end portions to the other of said end portions, said central bar being connected to said end bars by connecting bars, said central bar, said connecting bars and said end bars having generally the same height above said ground-engaging surface, said end bars at each of said end portions extending generally in a direction from one of said end edges to said central portion and the distance between at least one of said end bars and one of said side edges being less than the distance between said central bar and said one of said side edges so that the end portions are reinforced by the end bars and a central flex area is provided between the central bars of adjacent traction shoes for ejecting soil from the track.

2. A track in accordance with claim 1 wherein said bars at each of said end portions include a first transverse bar extending from said end edge in generally the same direction as said central bar and said connecting bars include a first angular bar extending between said transverse bar and said central bar in a direction at an acute angle to a first one of said side edges.

3. A track in accordance with claim 2 wherein said end bars at each of said end portions further include a second transverse bar spaced from said first transverse bar and extending from said end edge in generally the same direction as said first transverse bar, said connecting bars include a second angular bar extending between said second transverse bar and said central bar in a direction at an acute angle to a second one of said edges and in converging relation with said first angular bar.

4. A track in accordance with claim 3 wherein said first angular bar and said second angular bar have sloped sides and said space between said first angular bar and said second angular bar has a depth which decreases gradually at positions along said first and second angular bars as said sloped sides converge at said central bar providing a space having a shape to facilitate removal of soil in operation on a vehicle.

5. A track in accordance with claim 2 wherein said acute angle between said first angular bar and said first one of said side edges is from 10° to 30°.

6. A track in accordance with claim 1 wherein said end bars at each of said end portions include a first transverse bar extending from said end edge in generally the same direction as said central bar and a second transverse bar spaced from said first transverse bar and extending from said end edge in generally parallel relationship to said first transverse bar whereby the length of said shoes may be shortened and the same relationship between said central bar and said end bars is maintained.

7. A track in accordance with claim 1 wherein said connecting bars at each of said end portions include a first angular bar extending from one of said end portions to said central bar in a direction at an acute angle to a first one of said side edges and a second angular bar extending from said one of said end portions to said central bar in a direction at an acute angle to a second one of said edges and in converging relation with said first angular bar.

8. A track in accordance with claim 1 wherein said end bars extend from said end edges of said shoes to positions between said axial edges of said belt for reinforcing said end portions of said shoes.

9. A track in accordance with claim 1 wherein said end bars and said central bar of each of said shoes are located on said ground-engaging surface at positions symmetrical about a transverse centerline whereby said shoes may be used on wheels on either side of a vehicle.

10. A track in accordance with claim 1 wherein said end bars, connecting bars and said central bar have a width, height and spacing to provide a generally uniform section modulus transversely of said shoe.

* * * * *